United States Patent
Alsina et al.

(10) Patent No.: US 9,513,864 B2
(45) Date of Patent: Dec. 6, 2016

(54) BROADCAST CONTROL AND ACCRUED HISTORY OF MEDIA

(71) Applicant: Apple Inc., Cupertino, CA (US)

(72) Inventors: Thomas Alsina, Mountain View, CA (US); Lucas Newman, San Francisco, CA (US); Nicholas James Paulson, San Francisco, CA (US); Elbert D. Chen, Cupertino, CA (US); Augustin Prats, San Francisco, CA (US); Andrew T. Belk, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 389 days.

(21) Appl. No.: 13/829,470

(22) Filed: Mar. 14, 2013

(65) Prior Publication Data

US 2014/0266637 A1 Sep. 18, 2014

(51) Int. Cl.
| | |
|---|---|
| *G05B 11/01* | (2006.01) |
| *G06F 3/16* | (2006.01) |
| *G06Q 30/00* | (2012.01) |
| *G06Q 30/02* | (2012.01) |
| *G05B 15/02* | (2006.01) |
| *H04W 4/02* | (2009.01) |

(52) U.S. Cl.
CPC ............... *G06F 3/165* (2013.01); *G05B 15/02* (2013.01); *G06Q 30/00* (2013.01); *G06Q 30/02* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 2001/0053996 A1 | 12/2001 | Atkinson | |
| 2004/0070491 A1* | 4/2004 | Huang et al. | 340/10.5 |
| 2009/0082888 A1* | 3/2009 | Johansen | 700/94 |
| 2010/0075616 A1 | 3/2010 | Haughay, Jr. et al. | |
| 2010/0131675 A1* | 5/2010 | Pan | 709/247 |
| 2010/0317332 A1 | 12/2010 | Bathiche et al. | |
| 2011/0034121 A1 | 2/2011 | Ng et al. | |
| 2011/0209221 A1 | 8/2011 | Hanson et al. | |
| 2011/0275312 A1 | 11/2011 | Buehler et al. | |
| 2011/0287757 A1* | 11/2011 | Nykoluk et al. | 455/419 |
| 2012/0162536 A1 | 6/2012 | Sibilsky et al. | |
| 2012/0174037 A1 | 7/2012 | Relyea et al. | |
| 2012/0246240 A1 | 9/2012 | Hanlon | |
| 2012/0271823 A1 | 10/2012 | Asikainen et al. | |
| 2012/0282914 A1 | 11/2012 | Alexander | |
| 2012/0284012 A1 | 11/2012 | Rodriguez et al. | |
| 2012/0290653 A1 | 11/2012 | Sharkey | |
| 2012/0297423 A1 | 11/2012 | Kanojia et al. | |
| 2013/0058022 A1* | 3/2013 | Knutson et al. | 361/679.01 |

FOREIGN PATENT DOCUMENTS

WO 2012/015434 2/2012

* cited by examiner

*Primary Examiner* — Brian Zimmerman
*Assistant Examiner* — Thomas McCormack
(74) *Attorney, Agent, or Firm* — Polsinelli LLP

(57) ABSTRACT

Pairing a portable electronic device with a media device that is playing media, providing control to the portable device, displaying information about the media being played on the portable electronic device, and providing a link to the media asset in an online store. Discovering that a media device that is currently publically playing media, receiving a media signal encoded with metadata describing the media being played, and displaying an accrued history of various instances of media items that have been overheard during a public play session as a list of media items associated with metadata describing the media items.

19 Claims, 9 Drawing Sheets

BROADCAST CONTROL AND ACCRUED HISTORY OF MEDIA

BACKGROUND

1. Technical Field

The present disclosure relates to discovering media.

2. Introduction

Oftentimes media is consumed by listening to and watching media devices that are located far enough away from a user where it is inconvenient to control the media device through its native control interface. For example, when listening to a stereo a user typically must walk across a room or to another area of a house to adjust playback settings, change a radio station, etc. Likewise, when watching television, it is inconvenient to get up and walk to a set top device or the television itself in order to adjust volume, channel, etc.

Moreover, remote control devices are not adequate to control various types of media due to the fact that different types of media benefit from different sets of controls. Known remote control devices either include every possible control type, making them overly complicated, or include fewer controls than are required to conveniently control all media types. For example, a remote control designed to navigate a listed channel lineup is not particularly suited to enter text.

Additionally, when users consume media that they are unfamiliar with, they oftentimes wish to remember the details about the media, but typically forget. What is needed are systems and methods for providing media information to user devices which are usually carried on a person and providing control over media via those devices. Also what are needed are systems and methods for memorializing unfamiliar media that is consumed by a user who wishes to retrieve the information at a later time.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a portable device to discover and pair with a media device that is playing media and providing control to the portable device. Some embodiments involve receiving a media signal that has been encoded with a media type identifier and broadcasted by the media device that is playing the identified media, identifying a set of controls applicable to controlling the media type identified by the media type identifier, and displaying the set of controls in a control interface on the electronic device. Additionally, the user of the electronic device can provide an input into the control interface and transmit a control signal to the broadcast device for controlling the broadcast device based on the input.

Some embodiments of the present technology involve the portable device decoding the media signal and extracting a media store identifier describing where the media item being played is located in an online media store and linking the user to the store location. Some embodiments of the present technology involve the portable device decoding the media signal and extracting encoded metadata describing the media being played by the media device and displaying information about the media being played by the media device based on the metadata. Some embodiments involve using the metadata to select promotional content for the user.

In some embodiments of the present technology, the portable device is configured to automatically pause the media device playing media upon receiving a phone call in the portable device.

Also disclosed are systems, methods, and non-transitory computer-readable storage media for a portable device to discover a media device that is currently playing media, receive a media signal encoded with metadata describing the media being played, and displaying an accrued history of various instances of media items that have been overheard during a public play session as a list of media items associated with stored metadata describing the media items.

In some embodiments, the accrued history is organized by play session. The play session can be named after a wireless network used to broadcast the encoded media signal. In some embodiments, the portable device can include a GPS system and the play session can be named after a GPS-identified location where the publically played media is overheard.

In some embodiments of the present technology, the media signal is also encoded with a store identifier identifying the played media. The accrued history list can also include a link to automatically direct a user to the store to purchase an overheard media item.

In some embodiments, the portable device determines to add an overheard media item upon determining that it is closer than a threshold distance from the broadcasting device, determining a requisite the signal strength for the network used to transmit the encoded signal, or combinations thereof.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for systems and methods for providing media information to user devices which are usually carried on a person and providing control over media via those device and for systems and methods for memorializing unfamiliar media that is consumed by a user who wishes to retrieve the information at a later time.

Some embodiments of the present technology involve using a portable electronic device to control and monitor the media playback of other devices in a network. In some embodiments, the portable electronic device discovers one or more other network devices playing media, receives a media stream and information about the media, determines the type of media being streamed, and displays the information about the media as well as a set of controls particular to that type. Additionally, the network devices can broadcast a media item identifier for locating the media item in an online media distribution platform and the portable electronic device can receive the identifier and locate the media item in the media distribution platform.

Figure 1:
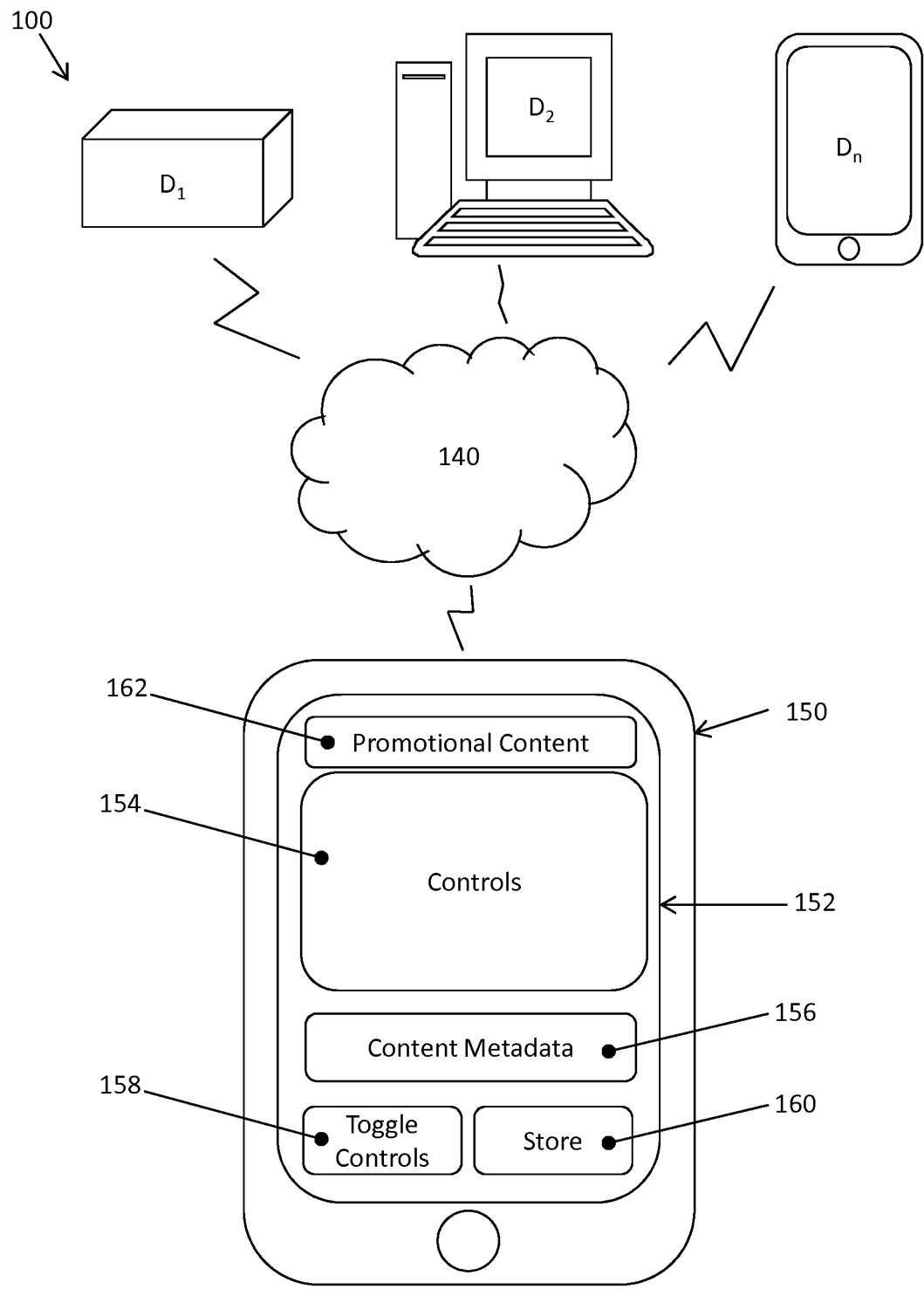
FIG. 1 illustrates a network environment for using a portable electronic device to control and monitor the media playback of other devices according to some embodiments of the present technology.

FIG. 1 illustrates a network environment 100 for using a portable electronic device 150 to control and monitor the media playback of other devices $D_1, D_2, \ldots, D_n$ according to some embodiments of the present technology. The devices $D_1, D_2, \ldots, D_n$ are configured with a network interface for connecting to a network. For example, as shown in FIG. 1, the devices $D_1, D_2, \ldots, D_n$ are configured to broadcast currently playing media and media information over wireless network 140. The devices $D_1, D_2, \ldots, D_n$ can include a wide variety of media devices. For example, as shown in FIG. 1, device $D_2$ can comprise a personal computer, device $D_n$ can comprise another portable electronic device, and device $D_1$ can comprise a television device such as AppleTV, developed by Apple Inc., Cupertino Calif.

Once networked, the devices $D_1, D_2, \ldots, D_n$ can encode a signal that is shared over the network 140. In some embodiments, the devices $D_1, D_2, \ldots, D_n$ broadcast information about currently playing media via a radio signal such as Bluetooth® or via a service discovery protocol such as Bonjour, developed by Apple Inc., Cupertino Calif., Universal Plug and Play (UPnP), zero configuration networking, etc. For example, in the case of broadcasted music, the devices can encode metadata about the artist name, album, media item title, track number, chapter number, genre, release date, popularity rating information, media artwork, etc. Although examples of metadata are described for music, those with ordinary skill in the art having the benefit of this disclosure will readily appreciate that the present technology can encode and broadcast media along with any type of metadata now known or later developed.

Additionally, in some embodiments of the present technology, the devices $D_1, D_2, \ldots, D_n$ encode a media type identifier along with the media signal. For example, device $D_1$ can identify that it is broadcasting television content. Likewise, if device $D_2$ is currently playing music in an media player it can encode the signal with a media identifier indicating that device $D_2$ is playing music. Similarly, if device $D_n$ is currently playing video content in an media player it can encode the signal with a media identifier indicating that device $D_n$ is playing video content. In some embodiments, media type identifiers can be used by the portable electronic device 150 to determine what types of information and controls to render and display.

For example, when the portable electronic device 150 recognizes a media type identifier and determines that a paired device is playing a movie, the portable electronic device 150 can render movie controls including, perhaps, a chapter menu button; however, if the portable electronic device 150 recognizes a media type identifier and determines that a paired device is playing music, the portable electronic device 150 would not render a chapter menu button because individual music items typically do not include chapter markers.

In some embodiments of the present technology, the devices $D_1, D_2, \ldots, D_n$ can be configured to stop broadcasting media signals if the device is currently coupled with headphones. In some embodiments, the devices $D_1, D_2, \ldots, D_n$ can determine that a two pin connection with a headphone jack is indicative of an external speaker while a three pin connection with a headphone jack is indicative of personal headphones.

Additionally, in some embodiments of the present technology, the devices $D_1, D_2, \ldots, D_n$ encode an identifier along with the metadata and the media type identifier. For example, devices $D_1, D_2, \ldots, D_n$ can encode the signal with a store identifier used in an online media distribution for identifying a digital media asset in an online media distribution platform, such as iTunes, available from Apple Inc., Cupertino Calif.

The portable electronic device 150 is configured with one or more interface for discovering one or more of the devices $D_1, D_2, \ldots, D_n$ that are playing media. For example, the portable electronic device 150 can include one or more of a Bluetooth® receiver, a WIFI antenna, etc. Once the portable electronic device 150 discovers a device broadcasting playback information, the portable electronic device 150 attempts to pair with the discovered device. In some embodiments, upon service discovery, the portable electronic device 150 displays an interface for entering a key required to pair with the discovered device. For example, a device discovered over a wireless network may require the wireless network key before pairing with a portable electronic device 150. In some other embodiments, a particular device can require additional access requirements such as a secret password or authorization of a token stored on the portable electronic device 150. For example, device $D_n$ can require that a portable electronic device 150 attempting to pair with it be associated with an account identifier or a device identifier specified by the user of device $D_n$. In some embodiments, the user of device $D_n$ can specify a list of account identifiers or device identifiers that are allowed to pair with it. The list can be stored in a network based online storage platform, such as iCloud, available from Apple Inc., Cupertino Calif. Also, some embodiments allow a user of a device to opt out of sharing their media information with others or allow a user to specify certain people or device to share media information with.

In some embodiments, once a portable electronic device 150 is paired with another device, it does not need to be authenticated in subsequent pairings. Conversely, some devices can require that the portable electronic device 150 authenticates itself for each pairing attempt.

Once paired with a device, the portable media device 150 can recognize the signal, extract metadata, extract a media type identifier, extract a store identifier, and render a display. In some embodiments, the portable media device 150 displays only the controls for controlling the currently playing media.

For example, when paired with a television and when searching for content in the television system, the media device can bring up a keyboard entry control interface for easily typing search terms. Likewise, the search results can be rendered on the portable media device in a format that is similar or identical to the television's native user interface. Additionally, in some embodiments a television system can be controlled using gestures on a coupled track pad. Accordingly, the portable device having a touchscreen interface can record gestures for controlling the television system.

Additionally, as the user of the portable media device 150 interacts with the rendered user control interface, the broadcasting device can reflect the user's interactions. For example, as a user scrolls through television content, the television can mirror the user's actions on the television interface itself.

In some embodiments, the portable media device 150 displays controls as well as information gleaned from the metadata used to identify the media items currently being played or to allow the user to explore more about the media items being played. For example, the media device can display media item title, artist, year released, track number, and associated artwork.

As shown in FIG. 1, the portable media device 150 renders a display 152 including controls 154 for controlling the currently playing media and content metadata 156 describing the currently playing media. The display 152 also includes a toggle button 158 for toggling the display of the controls and a store link 160 for accessing the currently played media item from an online store. In some embodiments, the display 152 includes advertisements and promotional content 162 selected based on the currently played media, user information, etc. In the embodiments involving user data, the present technology includes adherence to a user privacy policy that is explained in greater detail below.

The portable electronic device 150 is also configured to receive a user input for controlling the currently playing media transmitting a control signal back to the paired device. In some embodiments, the portable media device 150 has an operating system configured for performing these various steps. In some other embodiments, a special application is installed on the portable electronic device 150 and configured for carrying out these steps.

In some embodiments, the portable electronic device 150 is configured to receive cellular telephone calls, VoIP calls, video conferencing calls, etc. According to these embodiments, the portable electronic device can be configured to automatically send a control signal to paired devices causing the paired devices to pause media playback in the event of an incoming call.

Figure 2:
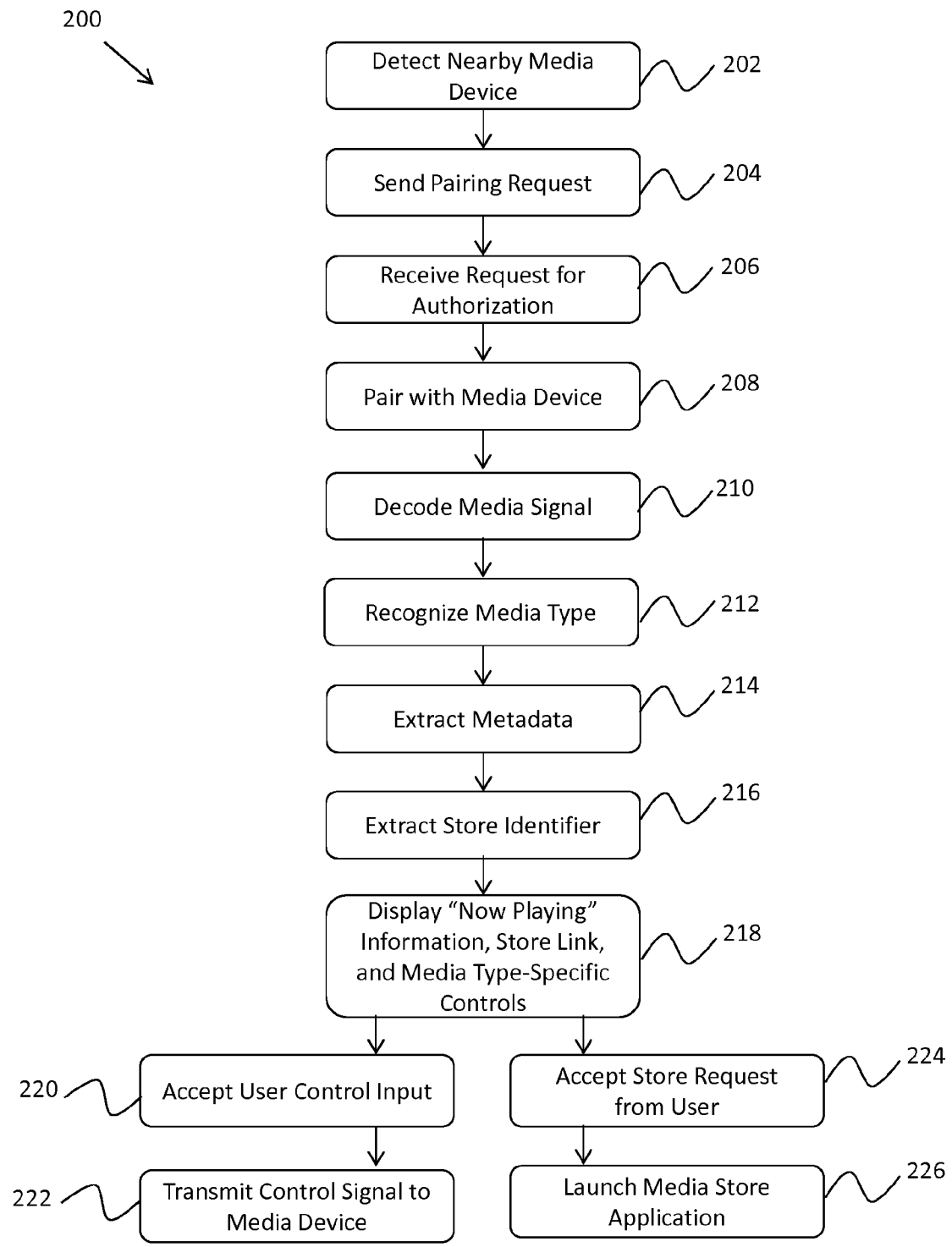
FIG. 2 illustrates a method of discovering a device playing media and controlling the device according to some embodiments of the present technology.

FIG. 2 illustrates a method 200 of discovering a device playing media and controlling the device according to some embodiments of the present technology. The method 200 involves a portable media device detecting nearby media devices 202, sending a request 204 to the device playing media, and receiving a request for authorization 206. Once the portable media device is authorized, it pairs with the device playing media 208 and decodes the media signal 210 broadcasted the device playing media. In some embodiments, the portable media device recognizes media type 212, extracts metadata 214, and extracts a store identifier 216 from the media signal.

The method 200 continues with displaying 218 "Now Playing" information using extracted metadata, a store link for finding the media in an online store using the extracted store identifier, and controls for controlling the device playing media according to the extracted media type identifier. In some embodiments, the portable electronic device automatically displays the controls while in some embodiments a user can access the controls through the device's interface.

Additionally, the portable electronic device can accept a control input 220 from a user and transmit a control signal back to the device playing media 222. Additionally, the portable electronic device can accept a store request from the user 224, which launches a media store application 226 and identifies a media asset identified by the store identifier.

Figure 3:
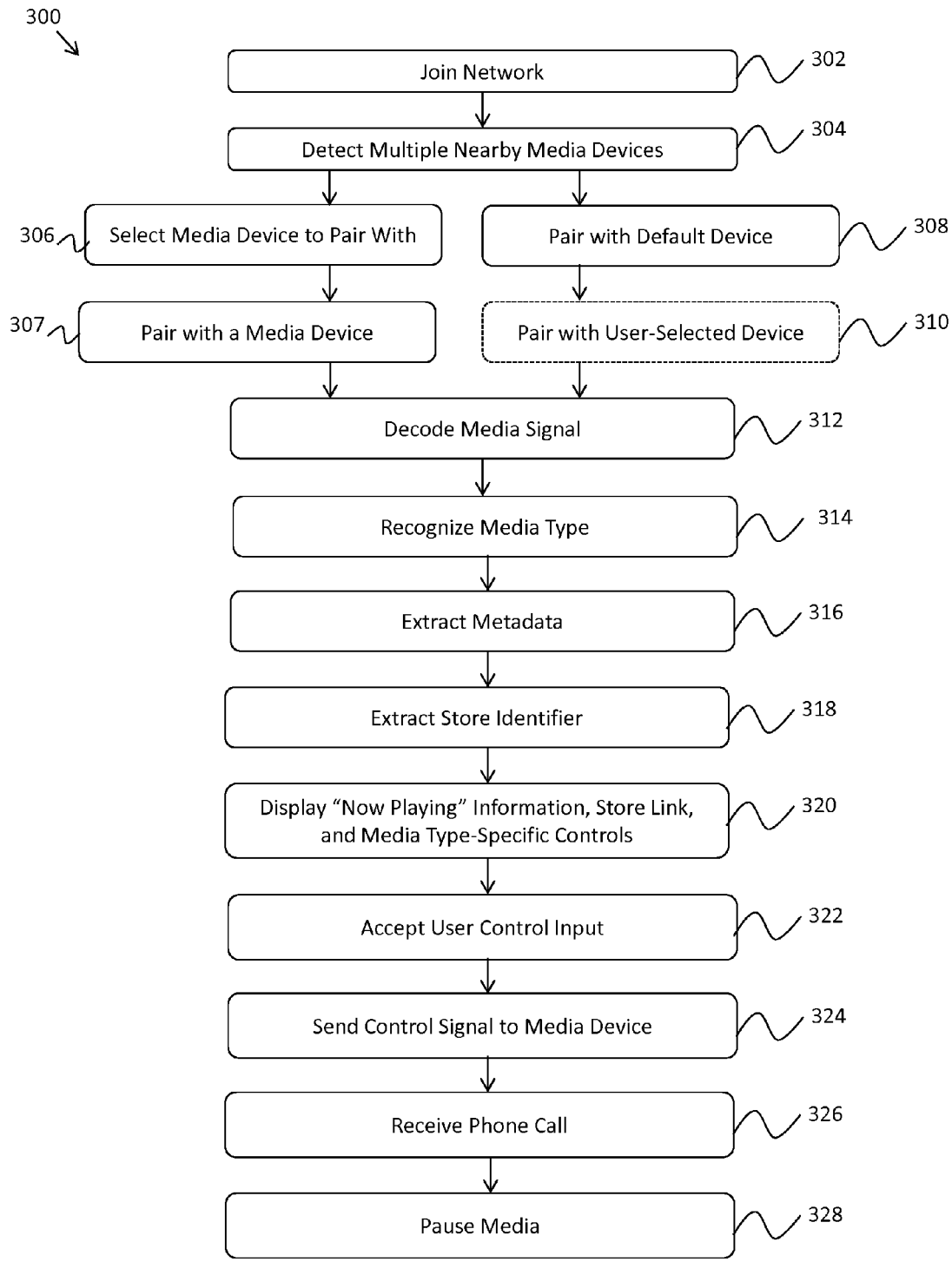
FIG. 3 illustrates an exemplary method of discovering devices playing media and controlling a device.

FIG. 3 illustrates an exemplary method 300 of discovering devices playing media and controlling a device. The method 300 begins with a portable electronic device joining a network 302 and detecting multiple devices playing media 304. A user of the portable electronic device can select 306 a particular device to pair with and control and pair with device 307. Alternatively, a default device can be assigned to the user 308 based on one or more variables (i.e. device signal strength, proximity to user using GPS data, etc.) or one or more user-defined rules. A user can optionally select a device different from the default device 310. Once the portable media device is paired with device playing media, it decodes the media signal 312 broadcasted the device playing media, recognizes media type 314, extracts metadata 316, and extracts a store identifier 318 from the media signal.

The method 300 continues with displaying 320 media information using extracted metadata, a store link for finding the media in an online store using the extracted store identifier, and controls for controlling the device playing media according to the extracted media type identifier. The portable electronic device can accept control inputs 322 from a user and transmit a control signals back to the device playing media 324.

Additionally, the method 300 involves receiving an incoming call in the portable electronic device 326 and automatically pausing the playback of media 328 on the paired device. In some embodiments, the media playback is only automatically paused when the call is from a number that the portable electronic device recognizes, i.e. a number in a list of user contacts.

Figure 4:
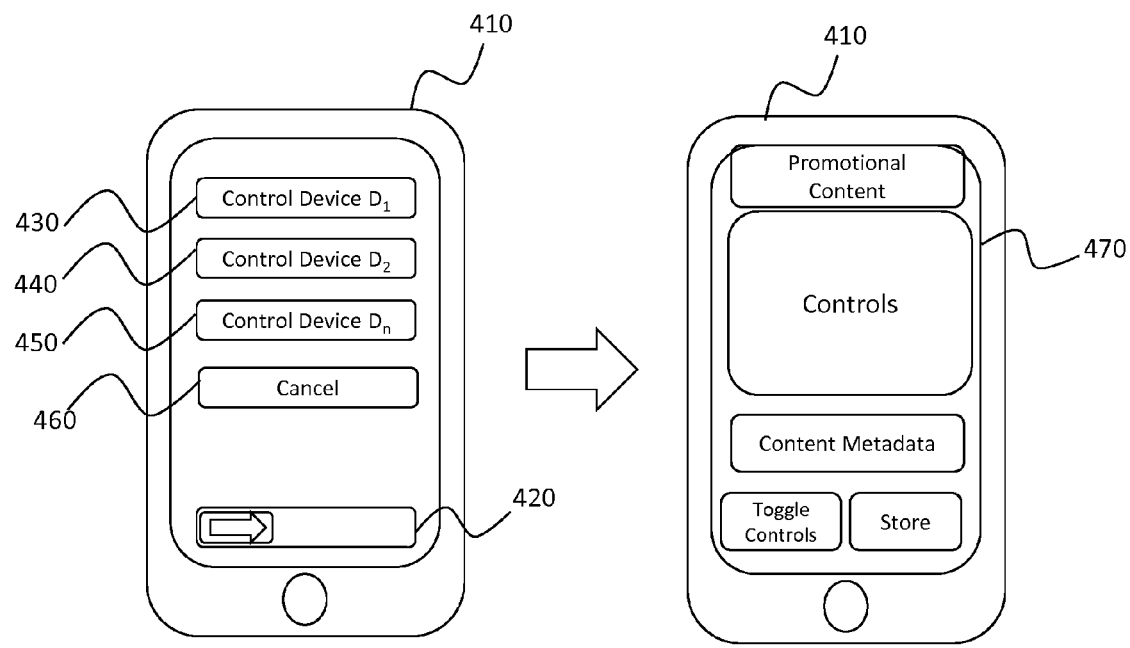
FIG. 4 illustrates an interface for selecting a playing a media device according to some embodiments of the present technology.

As explained above, some embodiments of the present technology involve a portable electronic device automatically pairing with a media device playing media. However, in some other cases, a user can choose from one or more devices to pair with. FIG. 4 illustrates an interface for selecting a playing a media device according to some embodiments of the present technology.

According to FIG. 4, a portable media device 410 displays an interface including an unlock tool 420 and notifications 430, 440, 450 showing the devices available for control. Upon unlocking the portable media device 410, the notifications 430, 440, 450 become interactive buttons that allow a user to chose a device to control. Additionally the interface includes a cancel button 460 allowing a user to forego pairing with a device. Upon selection of a device to control, the portable media device 410 displays a control interface 470, as explained above.

As discussed herein, some aspects of the present technology involves detecting media playing devices, receiving an encoded signal containing metadata describing the media, and extracting the metadata. Some other embodiments also involve saving an organized history of media detected by the device for later review and possible purchase.

Figure 5:
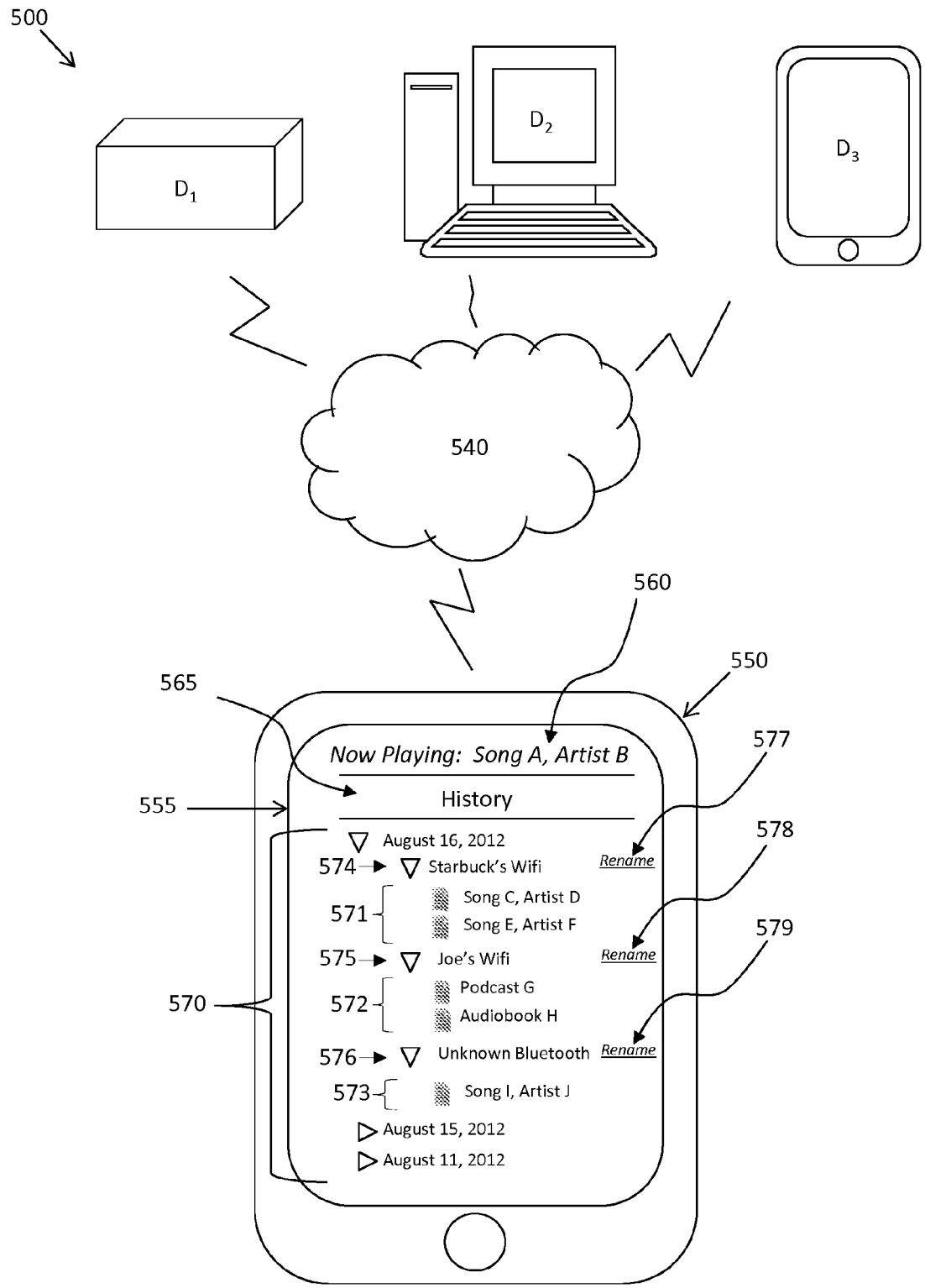
FIG. 5 illustrates an environment for sharing media information according to some embodiments of the present technology.

FIG. 5 illustrates an environment 500 for sharing media information according to some embodiments of the present technology. According to these embodiments, one or more of the devices $D_1, D_2, \ldots D_n$ on a network 540 broadcast signals encoded with media metadata. The devices $D_1, D_2, \ldots D_n$ can be configured to broadcast media metadata for any media associated with metadata. For example, a computer with a media player application can broadcast metadata stored in a media library; additionally, the computer can extract metadata for media that it is playing from a browser based media website (i.e. Youtube, Pandora, etc.) and broadcast the metadata. Additionally, a portable electronic device 550 is configured to decode the received signals and record a history of media played in its vicinity.

As shown in FIG. 5, the portable electronic device 550 includes an interface 555 displaying a media item that is currently being played 560 by one of the devices $D_1, D_2, \ldots, D_n$. Additionally, the interface 555 includes a history 565 of previously detected and decoded media items. The history 565 is represented in a per-session hierarchy 570 organized by dates and session identifying information 571, 572, 573 making it easy to find media items and to recall the circumstances in which the media items were consumed by the user. The session identifying information can include the name of a network 575 that the user was connected to when he consumed the media items. Additionally, the session identifying information can include a name of a business 574, as determined using GPS and map data, in which the media was consumed. Similarly, the location information can be and the playback history can be displayed on a map. Also, in the event that a location or a network name 576 is not helpful to remember the circumstances of a listening session, or if the user simply wants to customize the accrued list, the user can select a link 577, 578, 579 to rename a listening session to provide customized context.

In some embodiments of the present technology, the accrued history can be stored locally to the portable electronic device 550. In some other embodiments, the history is stored globally across all devices sharing an account with the portable electronic device 550. According to these embodiments, a user can access a list of heard media items through a media store interface associated with a user account, such as iTunes, anywhere that they can access the media store application.

Additionally, the history can be used to find media items in an online media platform. As explained above, in the case of media played in a media player, the device can encode a store identifier along with the metadata. However, the computer is likely unable to find a store identifier in the case of media played through a browser based media website. Accordingly, the portable media device 550 can be configured to use the metadata received and search an online media store for matching media items.

Figure 6:
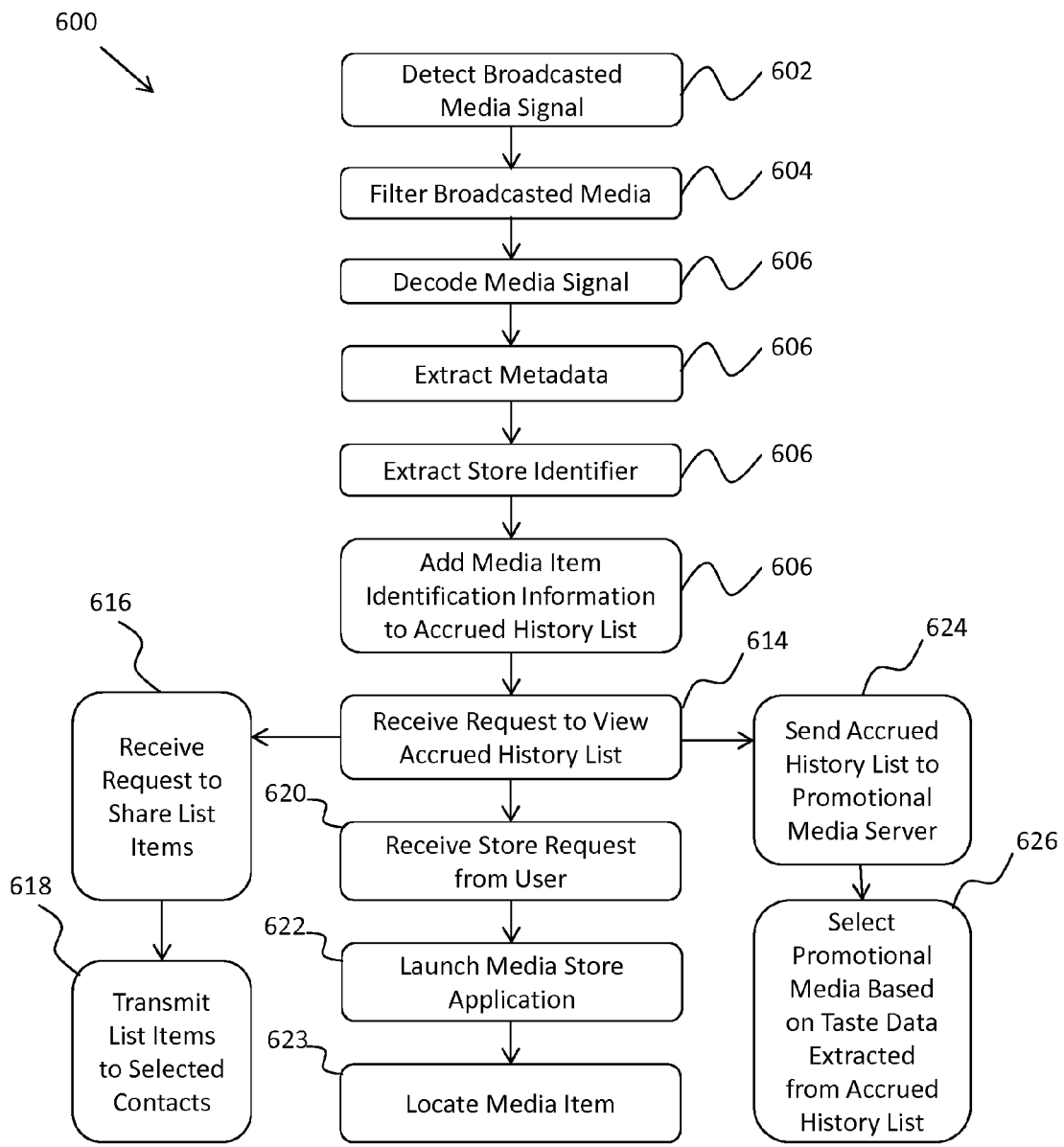
FIG. 6 illustrates a method of accruing a history of media items played by other devices in a user's vicinity according to some embodiments of the present technology.

FIG. 6 illustrates a method 600 of accruing a history of media items played by other devices in a user's vicinity according to some embodiments of the present technology. The method begins by detecting media being played in a user's vicinity 602.

Additionally, although a device is playing a media item, the device can be configured to forego broadcasting metadata to others. For example, a device can be configured to detect when headphones are being used and the device can default to not sending media item metadata or store identifiers. In some embodiments, a device detects that headphones are being used when a three-pin audio input is coupled to the device.

On the other hand, some embodiments involve configuring a media playing device to always broadcast media metadata and store identifiers in certain circumstances. For example, a device can be configured to detect when a device is connected to an external speaker and the device can default to sending media item metadata and store identifiers, if available.

Next, the method 600 involves filtering out broadcast devices 604 that the device can be configured to assume are not actually being listened to. For example, a device can be configured to compare GPS data for the device itself to GPS data of the broadcast device and determine that the broadcasting device is too far away from the user for the user to hear or see the media being played. In another example, a device can be configured to filter out media metadata signals that are being broadcasted over a WIFI network to which the user's device does not have a threshold signal strength and determine that the broadcasting device is too far away from the user for the user to hear or see the media being played. Likewise, a device can be configured to filter out media metadata signals that are being broadcasted over a Bluetooth connection to which the user's device is a threshold distance away from and determine that the broadcasting device is too far away from the user for the user to hear or see the media being played.

Figure 7:
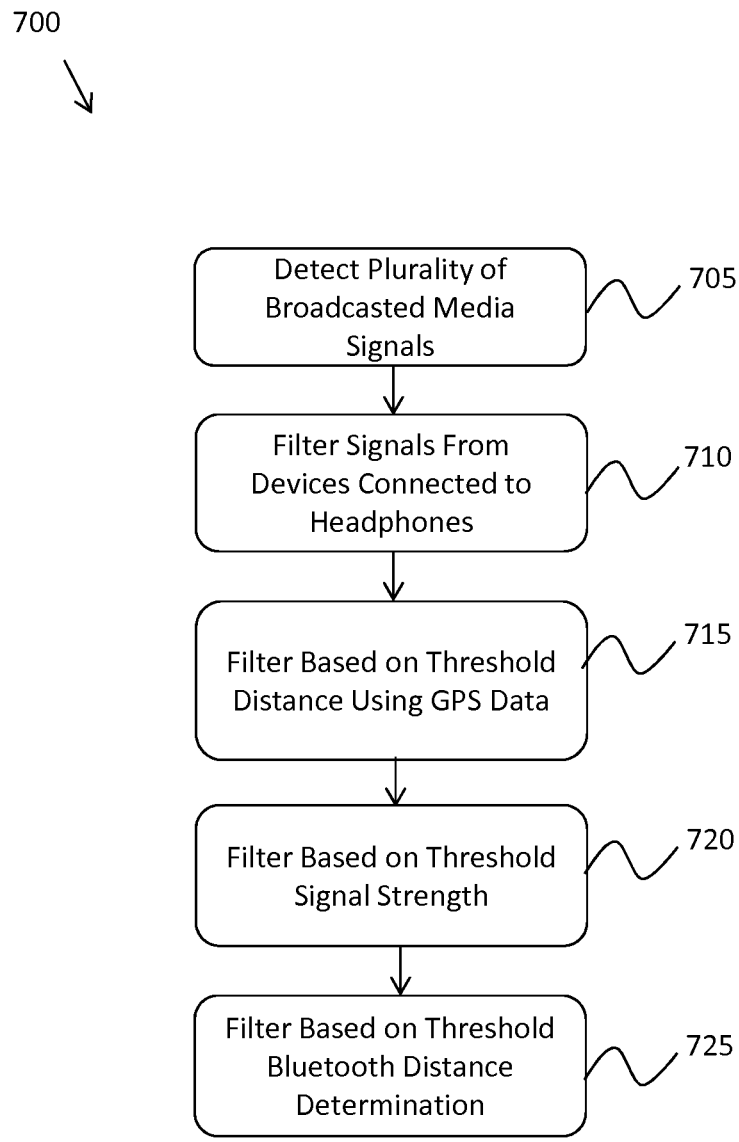
FIG. 7 illustrates an exemplary method for filtering broadcasted media signals.

Additionally, a combination of filtering methods can be used to narrow down what device broadcasts a user can actually hear or see. FIG. 7 illustrates an exemplary method 700 for filtering broadcasted media signals. The method 700 involves detecting a plurality of broadcasted media signals 705, filtering the signals based on determining that the media devices are coupled with headphones 710, filtering signals whose broadcasting device is a threshold distance away based on GPS data 715, filtering signals based on a threshold network signal strength 720, and filtering signals based on a threshold distance from a device using a Bluetooth distance determination 725.

Referring again to FIG. 6, the method 600 also involves decoding a media signal 606 to which the user's device receives broadcasted media item metadata and store identifiers, extracting metadata 608, extracting store identifiers 610, if applicable, and adding the metadata and store identifiers to an accrued history list of media items 612.

The method 600 also involves a receiving a request to view the accrued history list 614. As explained above, various embodiments of the present technology involve viewing accrued history lists stored on a local device only and stored globally across all devices and applications associated with a user account.

Upon accessing an accrued history list, a user can request that one or more items on an accrued history list be shared with one or more contact 616 and transmitting list items to selected contacts 618 via a social networking platform, email, SMS message, instant message, etc. Also, the method 600 also involves receiving a user request that one or more media item in the accrued history list be found in an online store 620, launching an online store application 622, and locating the identified media items. In some embodiments, the history view could have buy buttons next to media items in the list that can be used for instant purchase without launching a store application.

Additionally, some embodiments of the present technology involve sending the accrued history list to a promotional media server 624 and selecting promotional content to serve to the user based on the accrued history list 626. As explained above, in the embodiments involving user data, the present technology includes adherence to a user privacy policy.

As described above, some aspects of the present technology involves the gathering and use of data available from various sources to improve the delivery of advertisements or any other content that may be of interest to users. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 8A:
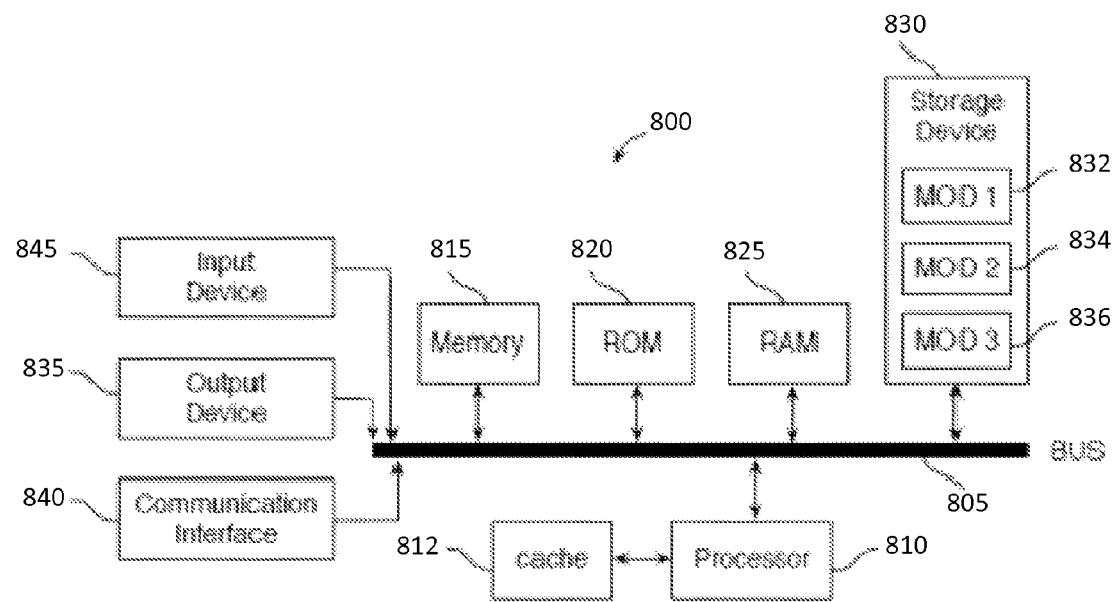
FIG. 8A illustrates a conventional bus computing system architecture according to some embodiments of the present technology.
Figure 8B:
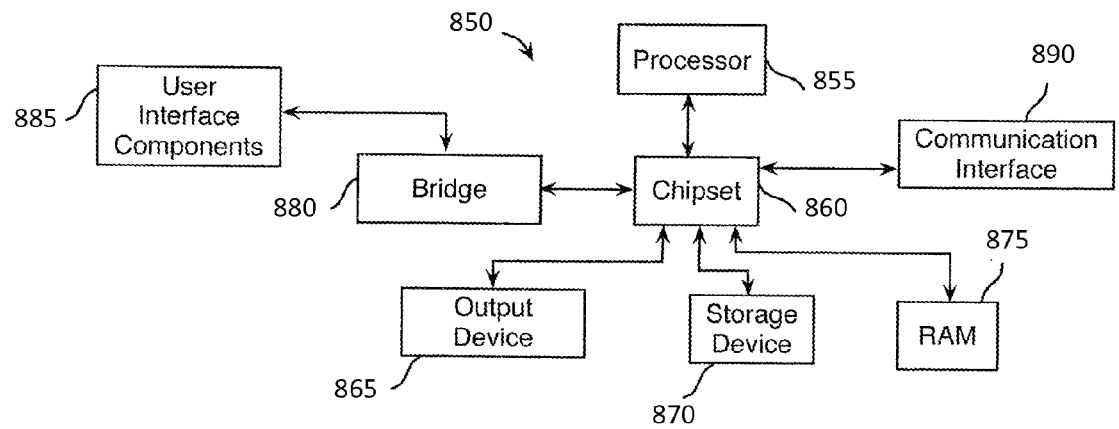
FIG. 8B illustrates a computer system having a chipset architecture according to some embodiments of the present technology.

FIG. 8A and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
   receiving, through a communication interface of an electronic device, a media signal encoded with a media type identifier transmitted by a media device playing media of a media type identified by the media type identifier;
   extracting, using a processor of the electronic device, the media type identifier from the media signal;
   identifying a set of controls stored in a non-transitory computer-readable medium of the electronic device, wherein the set of controls are configured for navigating the media based on the media type identified by the media type identifier, and wherein each of the controls in the set of controls corresponds to an input gesture and a control signal for controlling the media device;
receiving, through a touch-screen interface of the electronic device, an input gesture;
identifying, in the set of controls, the control signal that corresponds to the input gesture; and
transmitting, through the communication interface, the control signal to the media device for controlling the media device based on the input gesture.

2. The computer-implemented method of claim 1, further comprising:
receiving, in the media signal, a media store identifier describing where a media item being played is located in an online media store; and
displaying, on the touch-screen interface of the electronic device, a link to a location of the media item being played in the online media store.

3. The computer-implemented method of claim 1, further comprising:
receiving, in the media signal, encoded metadata describing the media being played by the media device; and
displaying, on the touch-screen interface of the electronic device, information about the media being played by the media device, wherein the information is based on the metadata.

4. The computer-implemented method of claim 3, further comprising:
transmitting the metadata to a promotional content server;
receiving, from the promotional content server, promotional content at least partially selected based on the metadata; and
displaying, on the touch-screen interface of the electronic device, the promotional content.

5. The computer-implemented method of claim 1, further comprising:
receiving, through the communication interface of the electronic device, a subsequent media signal encoded with an a different media type identifier transmitted by a media device playing media of the different media type;
extracting, using the processor of the electronic device, the media type identifier from the media signal;
identifying a different set of controls stored in a non-transitory computer-readable medium of the electronic device, wherein the set of controls are configured for navigating the media based on the different media type identified by the media type identifier;
displaying, on a touch-screen interface of the electronic device, the different set of controls.

6. The computer-implemented method of claim 1, further comprising:
receiving, in the electronic device, a voice communication request; and
automatically, upon receiving the voice communication request, transmitting a control signal to the media device for pausing the media being played.

7. A portable electronic device comprising:
a network interface configured to receive an encoded media signal transmitted by a media device playing media;
a touch-screen display;
a processor configured to:
extract a media type identifier, extract a media store identifier, and extract metadata describing the media being played;
identify a set of controls configured for navigating the media based on a media type identified by the media type identifier,
wherein each of the controls in the set of controls corresponds to an input gesture and a control signal for controlling the media device; and
a user interface configured to receive an input gesture; and
wherein the processor is further configured to identify, in the set of controls, the control signal that corresponds to the input gesture; and
wherein the network interface is further configured to transmit the control signal to the media device for controlling the media device based on the input gesture.

8. The portable electronic device of claim 7, wherein the processor is further configured to:
cause the display of a link to a location of the media being played in a online media store; and
upon receiving selection of the link, launch a online media store application and navigate to the location.

9. The portable electronic device of claim 7, wherein the processor is further configured to cause a display of information about the media being played based on the metadata.

10. The portable electronic device of claim 7, wherein the processor and network interface are further configured to:
transmit the metadata to a promotional content server;
receive, from the promotional content server, promotional content at least partially selected based on the metadata; and
cause the display of the promotional content.

11. The portable electronic device of claim 7, wherein the processor and network interface are further configured to:
receive a voice communication request; and
automatically, upon receiving the voice communication request, transmit a control signal to the media device for pausing the media being played.

12. A non-transitory computer-readable medium comprising:
a medium configured to store computer-readable instructions thereon; and
the computer-readable instructions that, when executed by a processing device cause the processing device to:
receive a media signal encoded with a media type identifier transmitted by a media device playing media of a media type identified by the media type identifier;
extract the media type identifier from the media signal;
identify a set of controls configured to navigate the media based on the media type identified by the media type identifier, wherein each of the controls in the set of controls corresponds to an input gesture and a control signal for controlling the media device;
receive through a touch-screen display, an input gesture through a control interface of the touch-screen display;
identify, in the set of controls, a control signal that corresponds to the input gesture; and
transmit the control signal to the media device for controlling the media device based on the input.

13. The non-transitory computer-readable storage medium of claim 12, the instructions further causing the processing device to:
receive, in the media signal, a media store identifier describing where the media item being played is located in an online media store; and
display, on the touch-screen display, a link to the location of the media item being played in the online media store.

14. The non-transitory computer-readable storage medium of claim 12, the instructions further causing the processing device to:
  receive, in the media signal, encoded metadata describing the media being played by the media device; and
  display, on the touch-screen display, information about the media being played by the media device, wherein the information is based on the metadata.

15. The non-transitory computer-readable storage medium of claim 14, the instructions further causing the processing device to:
  transmit the metadata to a promotional content server;
  receive, from the promotional content server, promotional content at least partially selected based on the metadata; and
  display, on the touch-screen display, the promotional content.

16. The non-transitory computer-readable storage medium of claim 12, the instructions further causing the processing device to:
  receive, in the electronic device, a voice communication request; and
  automatically, upon receipt of the voice communication request, transmit a control signal to the media device for pausing the media being played.

17. The computer-implemented method of claim 1, further comprising:
  identifying a set of voice controls stored in a non-transitory computer-readable medium of the electronic device, wherein the set of voice controls are configured for navigating the media based on the media type identified by the media type identifier;
  receiving, in the electronic device, a voice command from the set of voice controls; and
  transmitting a voice control signal to the media device for controlling the media being played based on the voice command.

18. The portable electronic device of claim 7, wherein the processor is further configured to:
  identify a set of voice controls configured for navigating the media based on the media type identified by the media type identifier;
  receiving, in the electronic device, a voice command from the set of voice controls; and
  transmitting a voice control signal to the media device for controlling the media being played based on the voice command.

19. The non-transitory computer-readable storage medium of claim 12, the instructions further causing the processing device to:
  identify a set of voice controls stored in a non-transitory computer-readable medium of the electronic device, wherein the set of voice controls are configured for navigating the media based on the media type identified by the media type identifier;
  receive, in the electronic device, a voice command from the set of voice controls; and
  transmit a voice control signal to the media device for controlling the media being played based on the voice command.

* * * * *